United States Patent [19]
Feng et al.

[11] Patent Number: 5,581,427
[45] Date of Patent: Dec. 3, 1996

[54] PEAK ENHANCED MAGNETORESISTIVE READ TRANSDUCER

[75] Inventors: Joseph Shao-Ying Feng; Mohamad T. Krounbi, both of San Jose; Douglas J. Werner, Fremont, all of Calif.

[73] Assignee: International Business Machines Corporation, Armonk, N.Y.

[21] Appl. No.: 238,110

[22] Filed: May 4, 1994

[51] Int. Cl.$^6$ ............................................. G11B 5/30
[52] U.S. Cl. ................................................ 360/113
[58] Field of Search ............................. 360/113, 126

[56] References Cited

U.S. PATENT DOCUMENTS

| | | | |
|---|---|---|---|
| 4,713,708 | 12/1987 | Krounbi et al. | 360/113 |
| 4,825,325 | 4/1989 | Howard | 360/113 |
| 5,005,096 | 4/1991 | Krounbi et al. | 360/113 |
| 5,272,582 | 12/1993 | Shibata et al. | 360/113 |

Primary Examiner—John H. Wolff
Attorney, Agent, or Firm—Baker, Maxham, Jester & Meador

[57] ABSTRACT

An MR read transducer is provided which has a central region located between a pair of end regions. The central region and the pair of end regions extend along a width of the MR read transducer. An MR layer extends along the width of the MR read transducer and has an active layer portion located between a pair of passive layer portions, the active layer portion being located in the central region and each passive layer portion being located in a respective end region. A layer is located in the central region and magnetostatically coupled to the active layer portion of the MR layer for transversely biasing the MR layer. Each passive layer portion of the MR layer is permeable so that it is responsive to externally applied magnetic fields. The passive layer portions of the MR layer are the only permeable portions of the MR read transducer in the end regions of the MR read transducer, so a response by either passive layer of the MR layer to a magnetic signal will result in a supralinearly increased net response of the active portion of the MR layer to the same applied magnetic field signal. This arrangement increases the amplitude and the sharpness of the peak of a signal response of the MR read transducer to the field from a recorded transition.

14 Claims, 4 Drawing Sheets

PEAK ENHANCED MAGNETORESISTIVE READ TRANSDUCER

BACKGROUND OF THE INVENTION

1. Field of the Invention

The present invention relates to a magnetoresistive (MR) read transducer and, more particularly, to a magnetoresistive read transducer which provides a high amplitude readback signal with increased peak sharpness.

2. Description of the Related Art

A magnetoresistive (MR) read transducer (also a "read element") employs a magnetoresistive (MR) stripe or layer which changes resistance in response to magnetic fields. A sensing current, which is passed through the MR stripe, generates a signal voltage that varies proportionally to the change in resistance of the MR stripe. The useful response of the MR stripe (also called the "readback signal") is the signal voltage produced by the sense current and the resistance change of the MR stripe in response to the change in magnetic field, typically from a magnetic storage medium such as a rotating magnetic disk or a moving magnetic tape.

Typically, the MR stripe includes a thin film layer sandwiched between bottom and top insulation layers and which, in turn, are sandwiched between bottom and top shield layers. The distance between the shield layers is called "the read gap". The smaller the read gap, the greater the spatial resolution of the MR read transducer, permitting more faithful recovery of digitally recorded information and increased linear densities.

In some magnetic recording systems, digital information is stored in the form of the relative locations of successive transitions. Decoding this information is made more reliable by improving the ability to determine the relative positions of the peaks in the readback signal. Accordingly, it is important that the peak readback signal from the MR read transducer be as narrow as possible and have as high an amplitude as possible.

One of the problems with an MR read transducer is that the MR stripe can generate self-induced noise which is manifested in the readback signal from the magnetic medium. An MR stripe is typically made of a thin film of permalloy, which is an alloy of nickel and iron. This can have a multidomain magnetic structure. When a magnetic field is applied to the permalloy MR film, the walls of the magnetic domains within the MR stripe can move irregularly, producing what is classically known as Barkhausen noise. In order to overcome this noise problem, the prior art teaches providing a longitudinally oriented magnetic biasing field for the MR stripe. This greatly increases the probability that the MR stripe will be in the desired single-domain state. This can be accomplished by magnetostatic coupling between permanent magnetic material placed adjacent to the MR stripe or by exchange coupling between either a permanent magnet material or antiferromagnetic material and parts of the MR stripe adjacent to the active region.

Another problem with an MR read transducer is that its signal response is not linear with respect to the strength of the externally supplied magnetic field. This problem has been overcome in the prior art by transversely biasing the MR stripe. A typical approach is to magnetostatically couple a soft magnetic layer with the MR stripe, as described in U.S. Pat. No. 3,864,751. When a sense current flows through the MR stripe, a magnetic field is generated around the stripe which is induced into the soft film magnetic layer. The soft film magnetic layer becomes magnetized, which in turn induces a magnetic field back into the MR stripe to cause the transverse biasing. The combination of the longitudinal and transverse biasing develops a magnetization vector for the MR stripe which is at an angle to the longitudinal axis of the MR stripe or to the air-bearing surface (ABS) of the MR read transducer. This angle is typically chosen to be about 45° to maximize the dynamic range of the MR stripe to an applied magnetic field.

One typical operating mode of an MR read transducer is to fly on an air cushion above a rotating magnetic disk. A suspension and a servo system operate to center the read transducer over a magnetically written track on the disk so that when the disk is rotated, a series of magnetic field signals, representing information, are imposed on the MR stripe. Since the design of an MR head normally follows the classic rule of "write wide and read narrow", a slight off-center positioning of the read element with respect to the track will not affect the response of the element.

A typical longitudinally and transversely biased MR transducer is described in U.S. Pat. No. 4,663,685. The MR read transducer, referred to as the continuous spacer exchange biased (CEB) transducer, employs an MR stripe located between a pair of passive portions. The passive portions are exchange-coupled to antiferromagnetic layers for the longitudinal biasing of the MR stripe. Upon the incursion of magnetic flux from a rotating disk, where the recorded tracks are wider than the central active portion of the transducer as described above, fields are also propagated in the passive portion of the CEB transducer. Prior to this patent, it was not recognized that these additional fields—from those parts of the track under the passive region—produce a supralinear cross talk signal which subtracts from the magnetic field produced by the parts of the track under the active portion of the MR stripe. As a consequence, this CEB transducer produces a readback signal which is wider and has a lower amplitude, and this is because the soft magnetic biasing layer has end portions that are magnetostatically coupled to the active portion of the MR stripe. In the presence of the wide-track magnetic field from the recording medium, the end portions of the soft magnetic material respond, and this in turn induces fields into the active portion of the MR stripe. Prior to this invention, it was not recognized that these fields are opposite in polarity to the field imposed on the active portion of the MR stripe.

Another prior art longitudinally and transversely biased MR read transducer is the contiguous-junction, hard-biased (CHB) transducer. In this transducer, a spacer is sandwiched between the MR stripe and a soft magnetic layer, and each of these layers is longitudinally biased at opposite ends by a pair of permanent magnets. The CHB transducer does not have any permeable layer portions which will add or subtract from the desired signal of the MR stripe.

SUMMARY OF THE INVENTION

The present invention provides an MR read transducer which preferentially enhances the peak of the readback signal produced by the transducer. This has been accomplished by providing the MR stripe with passive portions which are anisotropically permeable when the transducer is in a quiescent state, which occurs when a sense current flows through it and before an external magnetic field has been imposed onto the MR transducer. Since the passive portions of the MR stripe are permeable in the quiescent state, they can respond to the fringe fields from the magnetic medium. When these passive MR portions respond to the magnetic fields, they produce a magnetic signal in the active portion of the MR stripe that is supralinear. The result is that the magnetic signal in the active portion of the MR stripe is reinforced by the magnetic signal propagated through the passive portions of the MR stripe. More specifically, the magnetization vector in the active portion of the MR stripe is rotated clockwise or counterclockwise, depending on the polarity of the magnetic field form the recording medium. In addition, the magnetization vector in the active portion of the MR stripe is rotated a little bit further in the same direction by the magnetic fields propagated supralinearly in the passive portions of the MR stripe, producing a preferential enhancement at the peaks of the readback signal. In order to maintain the permeability of the passive portions of the MR stripe in the quiescent state of the transducer, it is important these passive portions be magnetically insulated form the permanent magnetic layers which cause the longitudinal biasing of the MR stripe. Further, it is important that the influence of the soft magnetic layer be confined to the active portion of the MR stripe and that if does not propagate a magnetic signal from the passive portions of the MR transducer.

An object of the present invention is to provide an MR read transducer which produces an improved readback signal.

Another object is to provide an MR read transducer with a structure that increases the peak amplitude of the readback signal.

Another object is to provide an MR read transducer with a structure that increases the sharpness at the peak of the readback signal.

A further object is to provide an MR read transducer which has permeable passive MR stripe portions which add to the signal response of the active portion of the MR stripe in the presence of the magnetic field from the magnetic recording medium, and which does not have permeable passive soft film portions which will subtract from the response of the active portion of the MR stripe.

Other objects and advantages will become apparent when considered in light of the following description of the invention.

DESCRIPTION OF THE PREFERRED EMBODIMENTS

Figure 1:
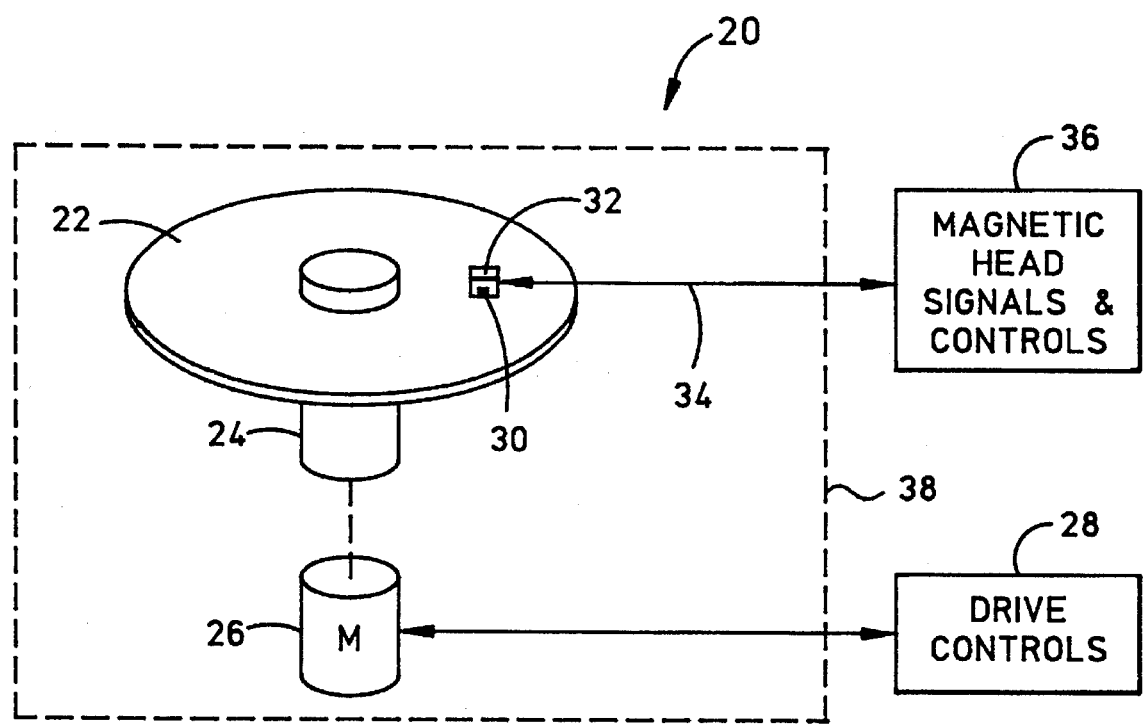
FIG. 1 is an exemplary magnetic media drive which employs the improved MR read transducer.

Referring now to the drawings, wherein like reference numerals designate like or similar parts throughout the several views, there is illustrated in FIG. 1 a magnetic disk drive 20 which includes a rotating disk 22. The disk 22 is supported by a spindle 24 which is rotated by a motor 26, the motor 26 being controlled by drive controls 28. An MR head 30 including a thin film MR read transducer is mounted on a slider 32, which in turn is supported by a suspension 34. Typically, the head 30 also includes a write element so that signals can be written and read from the same slider 32. The signals to and from the head 30 and its movements with respect to the magnetic disk 22 are controlled by magnetic head signals and controls 36. When the disk 22 is rotated, the slider 32 rides on a cushion of air (air bearing), which is generated by the movement of the disk 22. During the movement of the disk 22, the head 30 is in a transducing relationship with respect to one of a plurality of information-carrying, concentric circular tracks (not shown) on the disk. The bottom surfaces of the slider 32 and the head 30 are in a plane which is called an air-bearing surface (ABS). The ABS is spaced from the surface of the disk 22 by a distance in the order of 0.075 µm when the disk is rotating. The above components of the drive are mounted within a housing 38.

The MR read transducer of the head 30 includes an MR layer or stripe which is sandwiched between other layers which are not shown and will not be described since they are well-known in the prior art. For a more detailed discussion of a complete structure of an MR read transducer, refer to commonly assigned patent application of Heim and Gill, Ser. No. 08/103,487, which is incorporated by reference herein. The elements discussed in this description will be directed to the sensitive elements of the MR read transducer. These elements are an MR stripe or layer, permanent magnet layers, soft magnet layers, antiferromagnetic layers, and lead layers. All of these layers are thin films which are constructed by film deposition, plating, and photolithographic patterning techniques.

As stated hereinabove, the MR stripe of an MR read transducer must be longitudinally biased to overcome the problem of Barkhausen noise and must be transversely biased to linearize its signal response. The sensitive portions of a prior art MR read transducer having these features are illustrated at 40 in FIG. 3. This transducer is known as the continuous spacer exchange bias (CEB) transducer. The CEB transducer is described in U.S. Pat. No. 4,663,685. The CEB transducer 40 has a central region which is located between a pair of end regions, the central and end regions extending along the width of the transducer. The CEB transducer 40 includes a spacer layer 41 of nonmagnetic material which is sandwiched in direct contact between a soft magnetic layer (SML) 42 and an MR layer or stripe 43.

The spacer, soft magnetic and MR layers extend the width of the central and end regions so that each of these layers has a central portion which is located between a pair of end portions. A pair of spaced-apart antiferromagnetic layers (AFL) 44 and 45 are exchange coupled to the end portions of the MR stripe, which renders these end portions impermeable to magnetic flux incursions from a rotating disk and are typically referred to as passive portions of the MR stripe. The portion of the MR stripe between the passive portions and located in the central region is referred to as the active portion of the MR stripe. A pair of spaced-apart conductive leads 46 and 47 are electrically connected to the antiferromagnetic layers 44 and 45 for applying a sense current to the MR stripe. The antiferromagnetic layers longitudinally bias the passive portions of the MR stripe, which, in turn, longitudinally bias the active portion of the MR stripe. This is best illustrated in FIG. 4, which will be discussed next.

Figure 4:
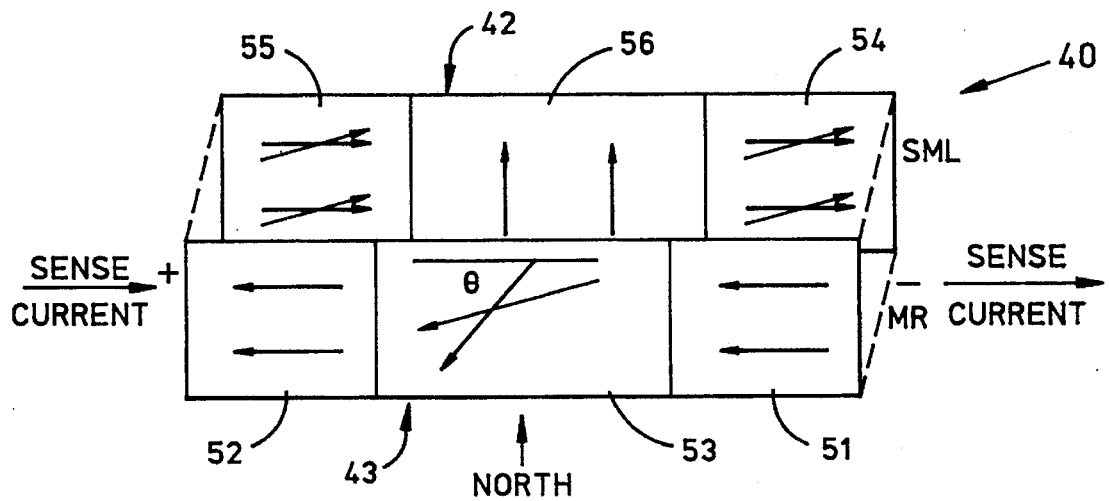
FIG. 4 is a schematic illustration of normally side-by-side MR and soft magnetic layers of FIG. 3 positioned one above the other for descriptive purposes, with the heavier arrows representing magnetization vectors in a quiescent state and the lighter arrows representing magnetization vectors after a north fringe field flux incursion from a magnetic disk (not shown) rotating therebelow.

In FIG. 4, the normally side-by-side MR layer or stripe 43 and the soft magnetic layer (SML) 42 are illustrated vertically out of position to better describe the quiescent and non-quiescent states of the magnetization vectors therein. FIG. 4 has omitted the spacer layer 41, the pair of antiferromagnetic layers 44 and 45, and the pair of leads 46 and 47. The magnetization vectors in the antiferromagnetic layers 44 and 45 are horizontally to the left, which is not shown in FIG. 4. Because of exchange coupling by direct engagement of the pair of antiferromagnetic layers 44 and 45 with right and left passive portions 51 and 52 of the MR stripe, the magnetization vectors in the passive portions of the MR stripe will likewise be to the left, as illustrated in FIG. 4. Because the MR stripe 43 is all one piece, the magnetization vector in the active portion 53 of the MR stripe will likewise be horizontally to the left (not shown) in the absence of any transverse biasing. Since the MR stripe 43 is magnetostatically coupled to the soft magnet layer (SML) 42 due to the presence of the spacer layer 41, the magnetic field due to the magnetization vectors in the passive portions 51 and 52 of the MR stripe will cause right and left portions 54 and 50 of the soft magnetic layer to be magnetized in anti-parallel directions, as shown by the heavy magnetization vectors to the right therein.

Figure 2:
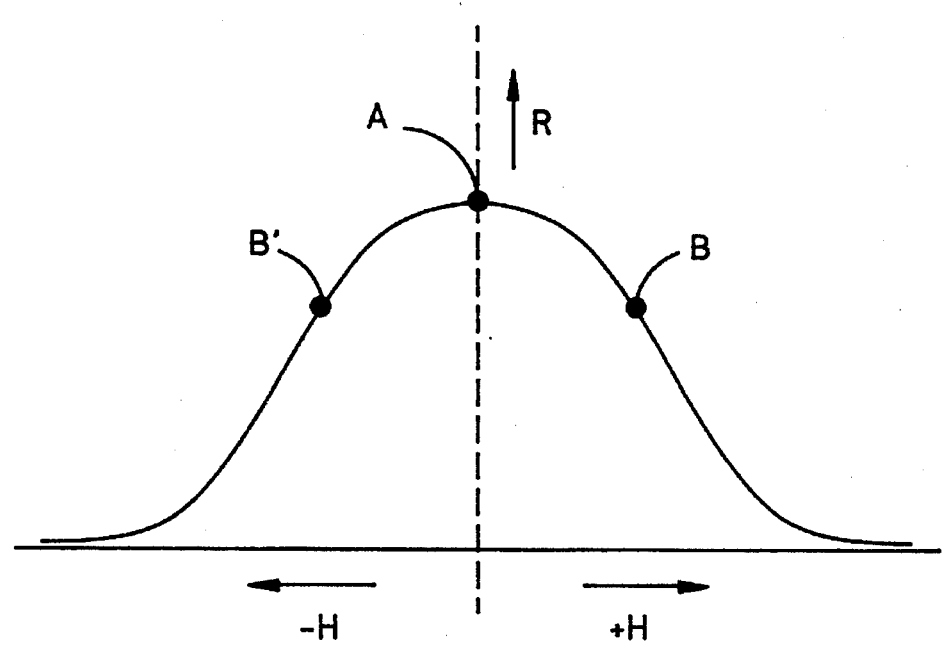
FIG. 2 is a curve showing the non-linear response of an MR stripe without any transverse biasing.

Upon the application of a sense current, the magnetization vector in the active portion 53 of the MR stripe will assume the heavy magnetization vector shown therein. This normally horizontal vector is rotated to its present position upon the application of the sense current. Assuming that the sense current flows from left to right, the right hand rule around a conductor tells us that a magnetic field will be directed upwardly and back of the MR stripe through the central portion 56 of the soft magnetic layer which in reality is in a side-by-side relationship with respect to the MR stripe 43. This causes the magnetization vectors in the central portion 56 to point vertically upward as shown in FIG. 4, which causes a magnetic field to be directed downwardly between the soft magnetic layer (SML) 42 and the MR stripe 43. The downwardly directed field will rotate the normally horizontal magnetization vector (not shown) in the active portion 53 of the MR stripe counterclockwise to the present position, which is shown by the heavy arrow therein. The angle θ that this arrow makes with a horizontal, which horizontal is parallel to the ABS, is known as the bias angle, which is important in establishing the linear response of the MR read transducer. This angle is normally about 45°. As shown in FIG. 2, the resistance of an unbiased MR stripe changes non-linearly with respect to a positive or negative applied field H. If a field, which is known as the bias field, is applied, then the MR stripe can operate in the B regions rather than immediately to the right or the left of the point A. The points B are approximately at a bias angle of 45°.

Figure 3:
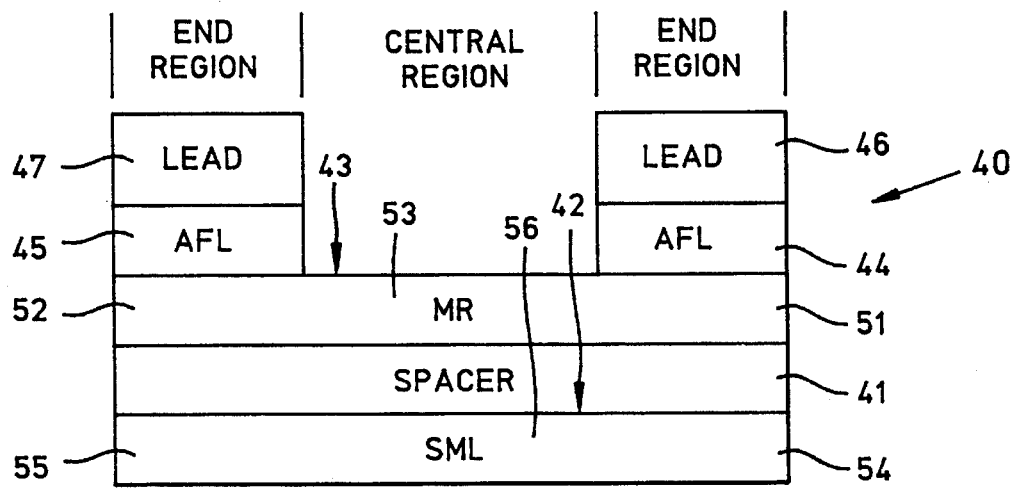
FIG. 3 is a schematic ABS view of elements of a prior art CEB MR read transducer, which is described in U.S. Pat. No. 4,663,685.

The problem with the CEB transducer 40 shown in FIGS. 3 and 4 is that upon the occurrence of a magnetic flux incursion from a magnetic disk, the responses of the end regions 54 and 55 of the soft magnetic layer subtract from the signal of the active portion 53 of the MR stripe. Assuming that there is a north field input from the magnetic disk, this will cause the magnetization vectors in the end regions 54 and 55 of the soft magnetic layer (SML) 42 to rotate counterclockwise to the lighter magnetization vectors shown therein. The north magnetic flux incursion causes the heavy magnetization vector in the active portion 53 of the MR layer to rotate clockwise to the lighter magnetization vector shown therein. As stated hereinabove, the end regions 54 and 55 of the soft magnetic layer (SML) are magnetostatically coupled to the MR stripe. The light magnetization vectors in the end regions 54 and 55 of the soft magnetic layer (SML) have vertical components which are directed upwardly. This causes a field to be directed downwardly between the soft magnetic layer (SML) 42 and the MR stripe 43. Some of this field encroaches into the active portion 53 of the MR stripe, causing the magnetization vector therein to be rotated counterclockwise to the position of the light magnetization vector therein. Otherwise, without the effect of the magnetic fields from the end regions 54 and 55 of the soft magnetic layer (SML) 42, the light magnetization vector in the active portion 53 of the MR stripe would have been in a position more clockwise than that shown, which would have provided a larger signal with a narrower peak. The peak signal response of the CEB MR read transducer of FIGS. 3 and 4 is illustrated by the curve 57 in FIG. 8 of the Applicants' drawings. Further, in FIG. 9, the signal voltage response versus applied field is shown at 58, where it can be seen that the signal drops off with an increasing positive or negative applied magnetic field. The present invention significantly improves the peak signal performance of that produced by the CEB transducer 40.

Figure 5:
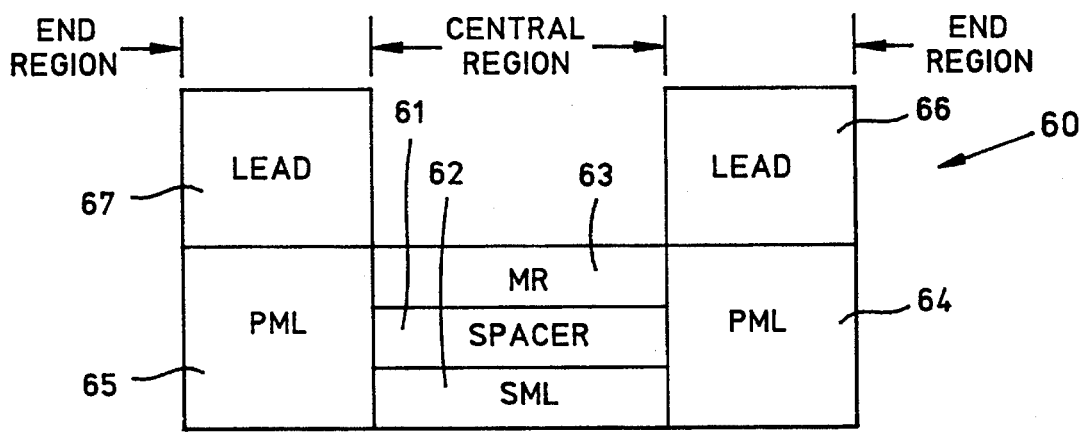
FIG. 5 is a schematic ABS view of the sensitive elements of a prior art CHB MR read transducer.

Another prior art MR read transducer is illustrated at 60 in FIG. 5. This is commonly called the contiguous junction hard biased (CHB) transducer. This transducer also has a central region which is located between a pair of end regions. It includes a nonmagnetic spacer layer 61, which is sandwiched between a soft magnetic layer 62 (SML) and an MR layer or stripe 63. All of these layers are located in the central region of the transducer. Opposite ends of the spacer, soft magnetic and MR layers are sandwiched between a pair of permanent magnetic layers (PML) 64 and 65 which are located in the end regions of the transducer. Electrically connected to the permanent magnetic layers are a pair of leads 66 and 69 which are also located in the end regions of the transducer. The permanent magnet layers (PML) 64 and 65 longitudinally bias the MR stripe 63 and the soft magnetic layer (SML) 62 transversely biases the MR stripe in the manner discussed hereinabove. The difference between the transducer 60 in FIG. 5 and the transducer 40 in FIG. 3 is that the transducer in FIG. 5 does not have any permeable magnetic layer portions in the end regions of the transducer to either add to or subtract from the signal response of the MR stripe. This is in contrast to the transducer 40 shown in FIG. 3, where the end region portions of the soft magnetic layer 42 produce a field which subtracts from the signal of the central active portion of the MR stripe.

Figure 6:
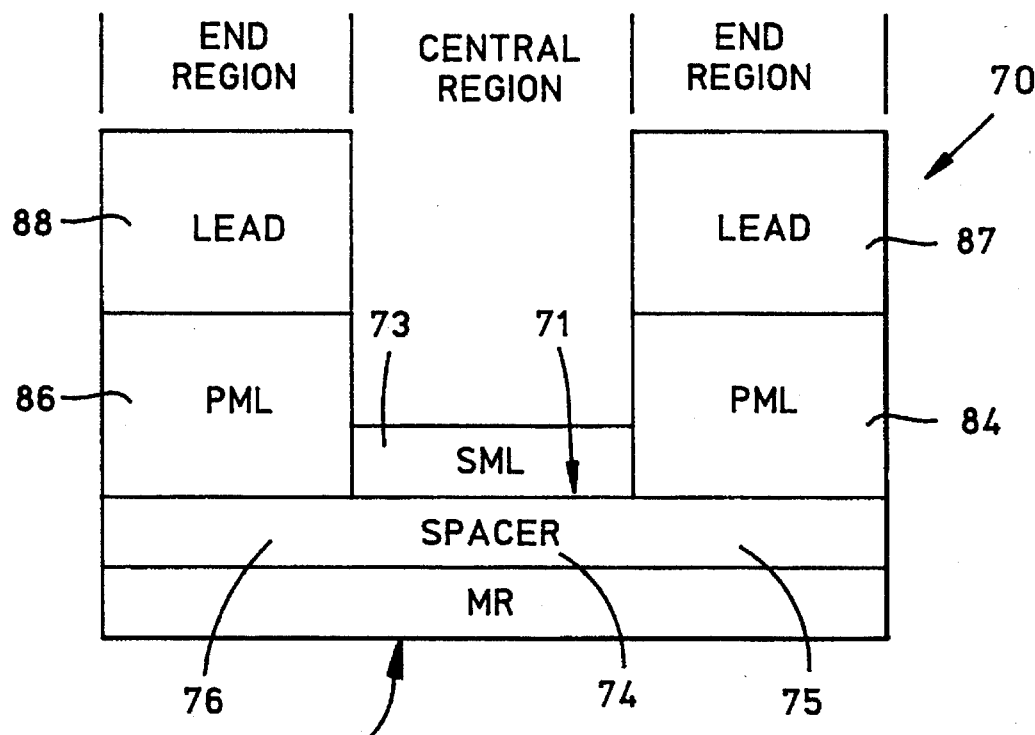
FIG. 6 is a schematic ABS view of the sensitive elements of the present MR read transducer.
Figure 7:
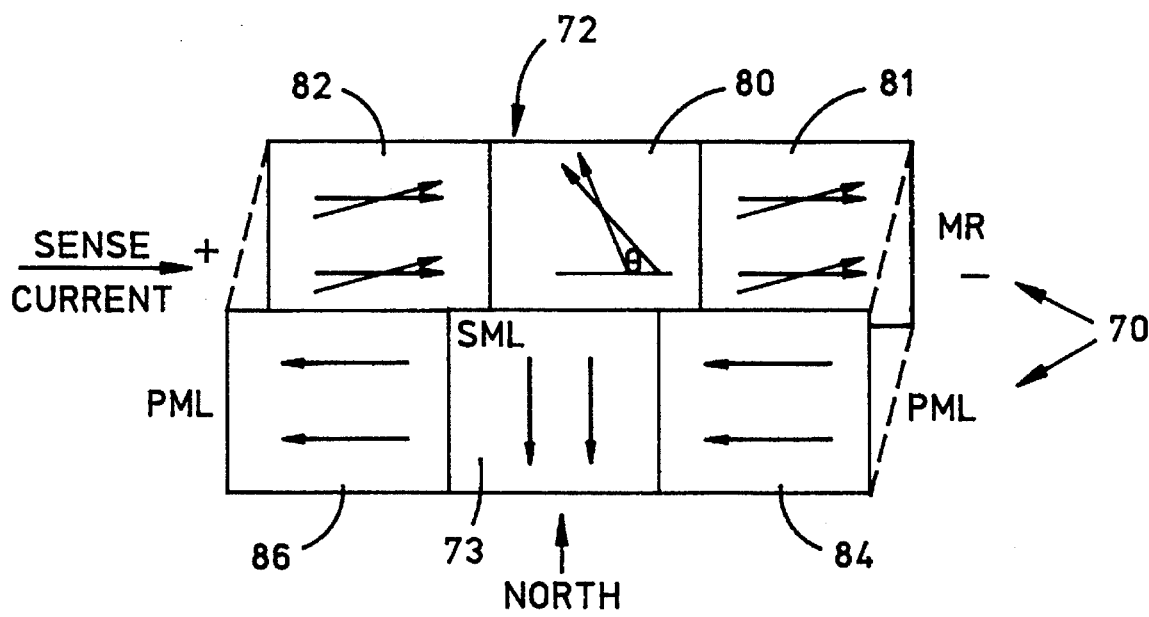
FIG. 7 is a schematic illustration of normally side-by-side MR, soft magnet and permanent magnet layers of the FIG. 6 embodiment positioned in an exploded perspective relationship for descriptive purposes with the heavy magnetization vectors representing the transducer in a quiescent state and the lighter magnetization vectors representing response of the transducer to a north fringe field flux incursion from a disk rotating therebelow.

The present invention is illustrated at 70 in FIGS. 6 and 7 FIG. 7 being an orthogonal partial view of FIG. 6 showing only the MR layer 72, the soft magnetic layer (SML) 73 and the permanent magnetic layers (PMC) 84 and 86. As stated hereinabove, this is only a portion of the MR read transducer which is sandwiched between insulative gaps (not shown) which, in turn, are sandwiched between first and second shield layers (not shown). As shown in FIG. 6, the MR read transducer 70 has a central region which is located between a pair of end regions. The central region and pair of end regions extend along the width of the MR read transducer 70. As shown in FIG. 6, a nonmagnetic spacer layer 71 is sandwiched in intimate contact between an MR layer or stripe 72 and a soft magnetic layer (SML) 73. The spacer layer 71 has a central portion 74 which is located between right and left end portions 75 and 76, the central portion 74 being located in the central region and the ends 75 and 76 being located in respective end regions. As shown in FIG. 7, the MR stripe 72 extends along the width of the MR transducer and has an active layer portion 80 which is located between a pair of right and left passive layer portions 81 and 82. The active layer portion 80 is located in the central region and each passive layer portion 81 and 82 is located in a respective end region of the transducer 70. As shown in FIGS. 6 and 7, the soft magnetic layer (SML) 73 is located only in the central region of the transducer. On top of the right and left end portions 74 and 76 of the spacer layer are located right and left permanent magnetic layers (PML) 84 and 86, respectively, which do not extend into the central region of the transducer.

It has to be kept in mind that the illustration in FIG. 7 is exploded vertically for descriptive purposes, and that in reality the soft magnetic layer (SML) 73 and the permanent magnetic layers (PML) 84 and 86 are behind the MR stripe 72 and are spaced therefrom by the spacer layer 71. The permanent magnetic layers (PML) 84 and 86 are employed for longitudinally biasing the MR stripe 72 and the soft magnetic layer (SML) 73 is employed for transversely biasing the active portion 78 of the MR stripe. The magnetization vectors may be horizontally to the left in the permanent magnetic layers (PML) 84 and 86. Since the permanent magnetic layers are magnetically insulated from the MR stripe by the spacer layer 71, they are magnetostatically coupled to the MR stripe, causing a magnetic field to come across the passive portions 81 and 82 of the MR stripe from left to right in FIG. 7. This causes the passive portions 81 and 82 to be magnetized from left to right as shown by the heavy magnetization vectors therein. There is another magnetic field in the central region of the transducer which is caused by the permanent magnetic layers 84 and 86. This field is directed from right to left from the right permanent magnetic layer 84 to the left permanent magnetic layer 86. This field will go from right to left across the active portion 78 of the MR stripe. But for the transverse biasing, which will be discussed hereinafter, this would cause a magnetization vector (not shown), which would be anti-parallel to the magnetization vectors shown in the right and left passive portions 81 and 82 of the MR stripe. It is important to note, however, that the passive portions 81 and 82 of the MR stripe are free to rotate in response to a magnetic field from a rotating disk since they are magnetostatically coupled to the permanent magnetic layers (PML) 84 and 86 instead of being exchange coupled thereto.

As stated hereinabove, the soft magnetic layer (SML) 73 is located only in the central region of the transducer. Assuming that a sense current is directed from left to right through the MR stripe 72, using the right hand rule magnetic field will be directed downwardly through the soft magnetic layer (SML) 73 causing its magnetization vectors to be directed downwardly as shown in FIG. 7. The magnetization of the soft magnetic layer (SML) 73 will cause a magnetic field to be directed upwardly across the active portion 78 of the MR stripe to cause the normally anti-parallel magnetization vector (not shown) to be angled upwardly to the heavy magnetization vector shown therein. As stated hereinabove, it is desirable for this bias angle θ to be approximately 45° to a horizontal or to the longitudinal axis of the MR stripe. As shown in FIG. 6, a pair of spaced apart leads 87 and 88 may be located in the end regions of the transducer and in electrical contact with the permanent magnetic layers (PML) 84 and 86 for transmitting a sense current through the MR stripe. The material of the spacer layer is nonmagnetic but may be electrically conductive. An example of a suitable material to accomplish this purpose is the beta phase of tantalum (Ta).

Figure 8:
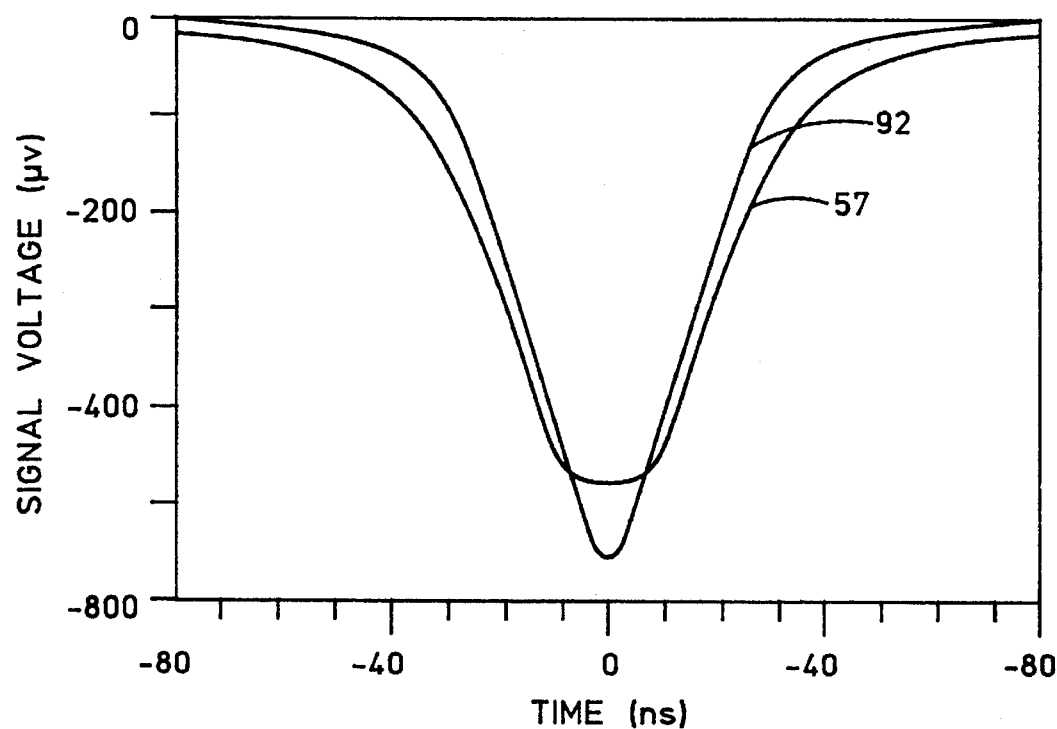
FIG. 8 illustrates signal versus time curves which compare the peak signal output of the present transducer with respect to the prior art CEB transducer.
Figure 9:
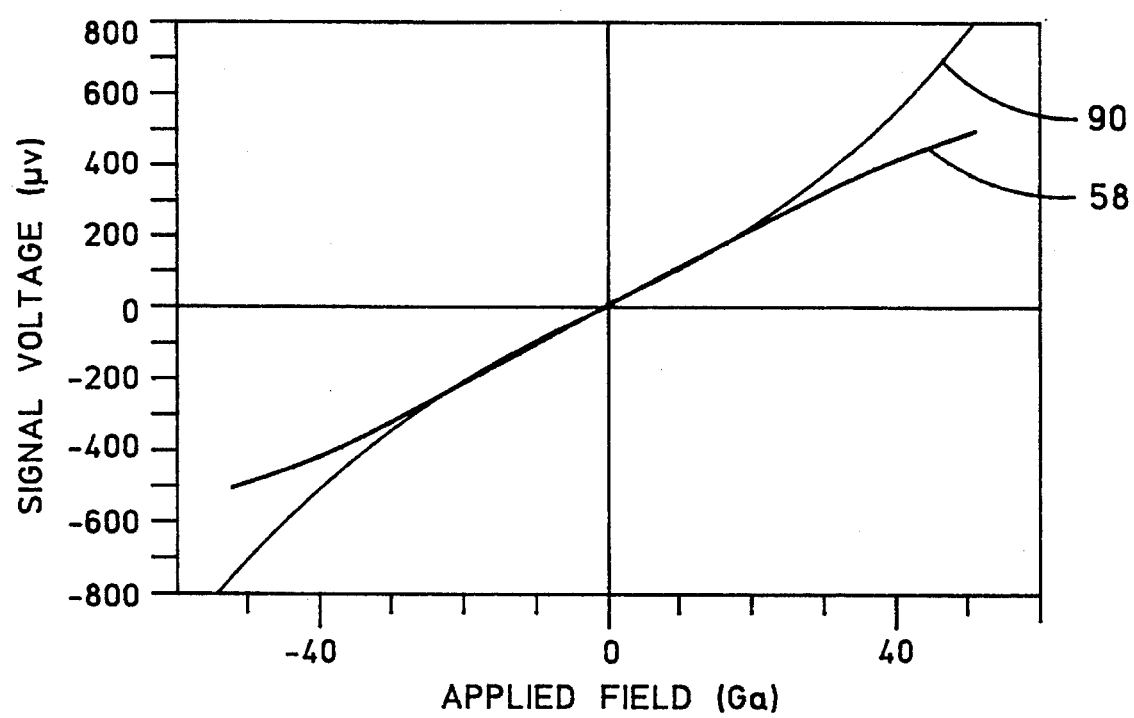
FIG. 9 illustrates voltage versus applied field curves which compare the signal response of the present transducer with respect to the prior art CEB transducer.

When the sense current is applied, the transducer is in a quiescent state and the magnetization vectors are shown in heavy lines in FIG. 6. When there is a north magnetic flux incursion from a magnetic disk (not shown) rotating below the transducer, the magnetization vectors in the MR stripe will be rotated to the light lines shown thereon. A north incursion will rotate the magnetization vectors in the right and left passive portions 81 and 82 of the MR stripe in a counterclockwise direction. The north magnetic incursion will rotate the magnetization vector in the active portion 80 of the MR stripe in a clockwise direction, as shown by the light arrow thereon. The light arrow magnetization vectors in the passive portions 81 and 82 of the MR stripe will have vertical components which are directed upwardly. Since the magnetic stripe is all one element, each of the upwardly directed vertical components in the passive regions 81 and 82 will influence the active region 80 by rotating its magnetization vector more clockwise than if the active region 80 was by itself without the passive wing portions 81 and 82. This means that the active central portion 80 of the MR stripe will sense a stronger and narrower signal than either of the prior art transducers illustrated in FIGS. 3 and 5. A comparison of the result of the present invention with the CEB transducer (see FIG. 3) is shown in FIG. 9. As stated hereinabove, the voltage response of the MR stripe of the CEB transducer versus applied magnetic field from a disk is shown by the curve at 56. The curve for the present invention is shown at 90 in FIG. 9. It can be seen that as the applied magnetic field increases (positively or negatively), the curve 90 for the present invention shows a signal voltage increase whereas the curve 58 for the CEB transducer shows a decrease in signal voltage. This difference in operation is because the passive portions 81 and 82, shown in FIG. 7, add supralinearly to the signal response of the active portion 78 of the MR stripe whereas the end portions 54 and 55 of the soft magnetic layer (SML) in FIGS. 3 and 4 subtract from the signal in the active portion 53 of the MR stripe. Another comparison is illustrated in FIG. 8, where the curve 92 shows the signal pulse response of the present invention in signal voltage versus time. The curve 57 shows the same response for the CEB transducer shown in FIG. 3. Using a same high $M_r t$ disk, the present invention has about 10 percent more amplitude and about 30 percent narrower PW50 than the prior art transducer shown in FIG. 3. Further, the second derivative of the peak of the curve 92 is about 3 times larger than the second derivative of the peak of the curve 57.

Producing this desirable response requires that the permanent magnet layers (PML) 84 and 86 in FIGS. 6 and 7 be thick enough to magnetostatically control both passive portions 81 and 82 of the MR stripe. If $t_{MR}$ and $M_{MR}$ are the thickness and the magnetization of the MR stripe, and $t_{PM}$ and $M_{PM}$ are the thickness and magnetization of the permanent magnet layer, then at a minimum, this requires that $t_{MR} \cdot M_{MR} \cdot \cos(\theta_{bias}) < t_{PM} \cdot M_{PM}$ where $\theta_{bias}$ is the biasing angle of the MR stripe. The excess magnetic field from the permanent magnet layer then magnetostatically couples to the passive portions 81 and 82 of the MR stripe to produce anti-parallel alignment of the passive portions 81 and 82 with respect to the active portion 80. If the permanent magnet layer is too thick, it would produce significant changes in the magnetic orientation of the soft magnetic layer. This limits the maximum value to:

$$t_{PM} \cdot M_{PM} < t_{MR} \cdot M_{MR} \cdot \{1 + \cos(\theta_{bias})\}.$$

Combining these requirements gives:

$$\cos(\theta_{bias}) < \frac{t_{PM} \cdot M_{PM}}{t_{MR} \cdot M_{MR}} < 1 + \cos(\theta_{bias}).$$

It should be understood that if the sense current was from right to left instead of from left to right, as shown in FIG. 6, that the magnetization vectors in the soft magnetic layer (SML) would be directed upwardly instead of downwardly and the heavy line magnetization vector in the MR stripe 72 would be directed downwardly and to the left approximately 90° from its present location. It should be understood that this would make no difference on the positive effects of the present invention caused by the passive portions 81 and 82 of the MR stripe. Further, if the magnetization vectors in the permanent magnetic layers (PML) 84 and 86 were directed to the right instead to the left, this would cause the heavy line magnetization vectors in the passive portions 81 and 82 of the MR stripe to be directed to the left instead of to the right. Here again this would make no difference on the beneficial effects of the invention caused by the passive portions 81 and 82 of the MR stripe. Obviously the same benefits are obtained if the MR stripe receives a south flux incursion from a magnetic disk instead of a north flux incursion.

A suitable material for the MR stripe 72 is permalloy, which is a mixture of iron and nickel. The permanent magnetic layers (PML) may be a combination of cobalt, platinum, and chromium (CoPtCr) and the soft magnetic layers may be a combination of nickel, iron, and X, where X is from the group of rhodium, chromium, and niobium (Rh, Cr, and Nb) and the spacer layer may be a low conductance material, such as Ta, $Al_2O_3$, $SiO_2$.

Obviously many modifications and variations of the present invention are possible in light of the above teachings. It is therefore to be understood that, within the scope of the appended claims, the invention may be practiced other than as specifically described.

We claim:

1. A magnetic transducer having a central region located between a pair of end regions, the central region and the pair of end regions extending along a width of the magnetic transducer, the magnetic transducer comprising:

an MR layer extending along the width of the magnetic transducer and having an active layer portion located between a pair of passive layer portions, the active layer portion being located in the central region and each passive layer portion being located in a respective end region of the magnetic transducer;

longitudinal biasing means located in the end regions and magnetostatically coupled to the passive portions of the MR layer for longitudinally biasing the MR layer along the width of the magnetic transducer;

transverse biasing means located in the central region and magnetostatically coupled to the active layer portion of the MR layer for transversely biasing the MR layer across the width of the magnetic transducer; and each passive layer portion of the MR layer being permeable so that it is responsive to magnetic flux; and the passive layer portions of the MR layer being the only portions in the end regions of the magnetic transducer which are permeable to magnetic flux so that a response by either passive layer portion of the MR layer to magnetic flux will result in an increased net response of the active portion of the MR layer to said magnetic flux.

2. A media drive including the magnetic transducer of claim 1, the drive including:

a housing;

means located within the housing for moving magnetic media; and means for supporting the magnetic transducer within the housing in a transducing relationship with respect to moving magnetic media.

3. A magnetic transducer as claimed in claim 1 including:

a pair of leads for transmitting a sense current through the MR layer, each lead being located in a respective end region and electrically connected to a respective passive portion of the MR layer; and the MR layer being in a quiescent state when the sense current is transmitted through the MR layer and an active state when magnetic flux passes through the MR layer.

4. A magnetic transducer as claimed in claim 1 including:

the longitudinal biasing means being a pair of permanent magnet layers, each layer being located in a respective end region.

5. A magnetic transducer as claimed in claim 4 including:

the transverse biasing means being a soft magnetic layer which is located only in the central region.

6. A magnetic transducer as claimed in claim 5 including:

a spacer layer located in the central and end regions and sandwiched between and in immediate contact with the permanent and soft magnet layers on one side and in immediate contact with the MR layer on an opposite side.

7. A magnetic transducer as claimed in claim 6 including:

each lead being in immediate contact with a respective permanent magnet layer.

8. A media drive including the magnetic transducer of claim 7, the drive including:

a housing;

means located within the housing for moving magnetic media; and means for supporting the magnetic transducer within the housing in a transducing relationship with respect to moving magnetic media.

9. A media drive as claimed in claim 8 including:

the spacer layer including a material which is nonmagnetic and with low conductivity such as Ta, $Al_2O_3$, $SiO_2$, each permanent magnet layer including CoPtCr, and the soft magnet layer including NiFeX where X is from the group Rh, Cr, and Nb.

10. An MR head having a central region located between a pair of end regions, the central region and pair of end regions extending along the width of the MR head, the MR head comprising:

an MR layer extending along the width of the MR head and having an active layer portion located between a pair of passive layer portions, the active layer portion being located in the central region and each passive layer portion being located in a respective end region of the MR head;

a pair of permanent magnet layers, each permanent magnet layer being located in a respective end region of the MR head for longitudinally biasing the MR layer;

a soft magnetic layer located in the central region for transversely biasing the MR layer;

a spacer layer located in the central and end regions and further located between the MR layer on one side and the permanent and soft magnet layers on an opposite side; and only one pair of magnetically permeable layers, each magnetically permeable layer of the pair of magnetically permeable layers being located in a respective end region, said only pair of magnetically permeable layers being said pair of passive layer portions of the MR layer, whereby the response of at least one of the passive layer portions of the MR layer to a magnetic field adds to the response of the active layer portion of the MR layer to the magnetic field.

11. An MR head as claimed in claim 10 including:

a pair of leads for transmitting a sense current through the MR layer, each lead being located in a respective end region and electrically connected to a respective passive layer portion of the MR layer;

the MR layer being in a quiescent state when the sense current is transmitted through the MR layer and in an active state when a magnetic field passes through the MR layer; and said pair of passive portions of the MR layer being permeable when the MR layer is in said quiescent state.

12. An MR head as claimed in claim 11 including:

the spacer layer being sandwiched between and in intimate contact with the soft and permanent magnet layers on one side and the MR layer on the other side.

13. A media drive including the MR head of claim 12, the media drive including:

a housing;

means located within the housing for moving magnetic media; and means for supporting the MR head within the housing in a transducing relationship with respect to moving magnetic media.

14. An MR read transducer having a central region located between a pair of end regions, the central region and pair of end regions extending along a width of the MR read transducer, the MR read transducer consisting essentially of:

an MR layer extending along the width of the MR read transducer and having an active layer portion located between a pair of passive layer portions, the active layer portion being located in the central region and each passive layer portion being located in a respective end region of the MR read transducer;

longitudinal biasing means located in the end regions of the MR read transducer for longitudinally biasing the MR layer along the width of the MR transducer;

transverse biasing means located in only the central region and magnetostatically coupled to the active layer region of the MR layer for transversely biasing the MR layer transverse the width of the MR transducer;

a pair of leads for transmitting a sense current through the MR layer, each lead being located in a respective end region and electrically connected to a respective passive portion of the MR layer;

the MR layer being in a quiescent state when the sense current is transmitted through the MR layer and in an active state when a magnetic field passes through the MR layer; and each passive layer portion of the MR layer being permeable when the MR layer is in the quiescent state so that it has a response to a magnetic field which is additive to a response of the active layer portion of the MR layer to said magnetic field; and the passive layer portions of the MR layer being the only permeable portions of the MR read transducer in the end regions of the MR read transducer when the MR layer is in a quiescent state.

\* \* \* \* \*

UNITED STATES PATENT AND TRADEMARK OFFICE
CERTIFICATE OF CORRECTION

PATENT NO. : 5,581,427
DATED : December 3, 1996
INVENTOR(S) : Feng et al

It is certified that error appears in the above-indentified patent and that said Letters Patent is hereby corrected as shown below:

Column 1, line 24, delete "and" second occurrence.

Signed and Sealed this

Twenty-seventh Day of January, 1998

Attest:

BRUCE LEHMAN

Attesting Officer

Commissioner of Patents and Trademarks